United States Patent
Toivola et al.

(10) Patent No.: US 9,768,608 B2
(45) Date of Patent: Sep. 19, 2017

(54) METHOD AND CIRCUITRY FOR BATTERY PROTECTION

(75) Inventors: Timo Toivola, Turku (FI); Juhani Kari, Lieto (FI)

(73) Assignee: Nokia Technologies Oy, Espoo (FI)

( * ) Notice: Subject to any disclaimer, the term of this patent is extended or adjusted under 35 U.S.C. 154(b) by 510 days.

(21) Appl. No.: 14/372,185

(22) PCT Filed: Feb. 14, 2012

(86) PCT No.: PCT/FI2012/050136
§ 371 (c)(1),
(2), (4) Date: Oct. 11, 2014

(87) PCT Pub. No.: WO2013/121074
PCT Pub. Date: Aug. 22, 2013

(65) Prior Publication Data
US 2015/0022926 A1 Jan. 22, 2015

(51) Int. Cl.
*H02M 1/32* (2007.01)
*H02M 1/36* (2007.01)
(Continued)

(52) U.S. Cl.
CPC .............. *H02H 3/243* (2013.01); *G06F 1/26* (2013.01); *H02J 7/0029* (2013.01); *H02J 2007/004* (2013.01)

(58) Field of Classification Search
CPC ............ H01M 1/32; H01M 1/36; H02M 1/32; H02M 1/36
(Continued)

(56) References Cited

U.S. PATENT DOCUMENTS

| 4,638,396 A | 1/1987 | Mukli et al. |
| 5,530,336 A | 6/1996 | Eguchi et al. |

(Continued)

FOREIGN PATENT DOCUMENTS

| CN | 101656426 A | 2/2010 |
| DE | 3201758 A1 | 9/1983 |

(Continued)

OTHER PUBLICATIONS

Office action received for corresponding Chinese Patent Application No. 201280069620.X, dated Dec. 9, 2015, 09 pages of office action and no pages of office action translation available.

(Continued)

*Primary Examiner* — Dharti Patel
(74) *Attorney, Agent, or Firm* — Banner & Witcoff, Ltd.

(57) ABSTRACT

There is disclosed a method comprising providing a first signal to an apparatus comprising a protection circuit and an output for providing electric power. The protection circuit comprises at least an overdischarge detection element and a discharging control output. The first signal is used to change a voltage level at an input of the overdischarge detection element of the protection circuit. The change of the voltage level at the input of overdischarge detection element is detected, and a second signal is provided at the discharging control output to switch off the output of the apparatus. There is also disclosed an apparatus comprising a protection circuit comprising at least an overdischarge detection element and a discharging control output. The apparatus also comprises an output for providing electric power; the protection circuit; and a first signal input adapted to receive a first signal to change a voltage level at an input of the overdischarge detection element of the protection circuit. The overdischarge detection element is configured for detecting the change of the voltage level at the input of the (Continued)

overdischarge detection element, and for providing a second signal at the discharging control output to switch off the output of the apparatus.

19 Claims, 6 Drawing Sheets

(51) Int. Cl.
  *H02H 3/24* (2006.01)
  *G06F 1/26* (2006.01)
  *H02J 7/00* (2006.01)
(58) Field of Classification Search
  USPC .......................................................... 361/92
  See application file for complete search history.

(56) References Cited

U.S. PATENT DOCUMENTS

| | | | | |
|---|---|---|---|---|
| 5,783,322 A * | 7/1998 | Nagai | ................... | H01M 10/48 320/134 |
| 6,313,610 B1 | 11/2001 | Korsunsky | | |
| 6,670,790 B2 * | 12/2003 | Stellberger | ............ | H02J 7/0026 320/132 |
| 6,903,533 B1 | 6/2005 | Geren et al. | | |
| 7,830,120 B2 * | 11/2010 | Ibrahim | ................ | H02J 7/0031 307/10.7 |
| 8,081,410 B1 * | 12/2011 | Wang | ................... | H02J 7/0031 361/93.1 |
| 8,704,491 B2 * | 4/2014 | Sugiura | ................. | H02J 7/0031 320/134 |
| 8,773,830 B2 * | 7/2014 | Ikeuchi | ................. | H01M 10/48 320/134 |
| 2004/0109274 A1 | 6/2004 | Sato | | |
| 2004/0189259 A1 * | 9/2004 | Miura | .................... | H02J 7/0031 320/134 |
| 2005/0182987 A1 * | 8/2005 | Sakurai | ...................... | G06F 1/30 713/340 |
| 2009/0202890 A1 * | 8/2009 | Takeda | .................... | H01M 2/34 429/62 |

FOREIGN PATENT DOCUMENTS

| | | |
|---|---|---|
| EP | 0588615 | 3/1994 |
| EP | 1544976 | 6/2005 |
| EP | 1868274 A1 | 12/2007 |
| EP | 2360806 A2 | 8/2011 |

OTHER PUBLICATIONS

Office action received for corresponding Chinese Patent Application No. 201280069620.X, dated May 18, 2016, 10 pages of office action and no pages of office action translation available.

Written Opinion received for corresponding Patent Cooperation Treaty Application No. PCT/FI2012/050136, dated Nov. 7, 2012, 8 pages.

International Search Report received for corresponding Patent Cooperation Treaty Application No. PCT/FI2012/050136 dated Nov. 7, 2012, 5 pages.

Extended European Search Report received for corresponding European Patent Application No. 12868463.6, dated Oct. 1, 2015, 6 pages.

\* cited by examiner

METHOD AND CIRCUITRY FOR BATTERY PROTECTION

RELATED APPLICATION

This application was originally filed as PCT Application No. PCT/FI2012/050136 filed Feb. 14, 2012.

FIELD OF THE INVENTION

The invention relates to battery protection circuitry and methods for protection of batteries.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Many accessories for electronic devices are getting smaller and smaller in size. Such accessories are, for example, hands-free headsets for e.g. mobile terminals. Also other accessories for mobile terminals and other portable devices may be designed so that the size of the accessories can be decreased.

Not only the size but also the current consumption in active mode such as talk and music listening mode has recently been decreasing and this trend is still going on.

Recently, very small headsets have been developed for portable devices. The smaller size of the accessories may cause that the size of batteries for such accessories should also become smaller. Current consumption while talking has become smaller so that it is possible to use smaller sized batteries and still achieve long enough operating time of a full charged battery.

Many wireless headsets use lithium ion batteries which need battery protection circuitry for safe charging and good battery lifetime. Recently, some accessories have been designed to use lithium polymer batteries which may provide more capacity than lithium ion batteries or other batteries of the same size suitable for small accessories. In other words, the energy density of lithium polymer batteries may be higher than the energy density of e.g. lithium ion batteries.

Batteries tend to discharge although they were not connected to any load. This feature may also be called as a self discharge. Different types of batteries may have different discharging properties so that some battery types may maintain the charge longer than some other battery types. The battery self discharge may be relatively worse in small batteries than in large batteries.

The storage time of batteries when shipped from a factory to a supply chain and to an end user may be several months. It is therefore intended to minimize more the power consumption in a power off state to prevent permanent damage to a battery.

SUMMARY

According to some example embodiments of the present invention there is provided a method and apparatuses for protecting a battery. In some embodiments a protection element of an apparatus may be switched to a low-power mode by using software of a device or manually by activating a switch, for example. The normal operation of the protection element may be resumed by providing a signal e.g. manually or by software.

Various aspects of examples of the invention are set out in the claims.

According to a first aspect of the present invention, there is provided a method comprising:
providing a first signal to an apparatus comprising a protection circuit and an output for providing electric power; the protection circuit comprising at least an overdischarge detection element and a discharging control output;
using the first signal to change a voltage level at an input of the overdischarge detection element of the protection circuit;
detecting the change of the voltage level at the input of overdischarge detection element, and
providing a second signal at the discharging control output to switch off the output of the apparatus.

According to a second aspect of the present invention, there is provided an apparatus comprising:
a protection circuit comprising at least an overdischarge detection element and a discharging control output;
an output for providing electric power; the protection circuit;
a first signal input adapted to receive a first signal to change a voltage level at an input of the overdischarge detection element of the protection circuit;
wherein the overdischarge detection element is configured for:
detecting the change of the voltage level at the input of the overdischarge detection element, and
providing a second signal at the discharging control output to switch off the output of the apparatus.

According to a third aspect of the present invention, there is provided an apparatus comprising a processor and a memory including computer program code, the memory and the computer program code configured to, with the processor, cause the apparatus to:
receive a signal to switch-off a protection circuit; and generate a switch-off signal to the protection circuit.

According to a fourth aspect of the present invention, there is provided an apparatus comprising:
a protection circuit comprising at least an overdischarge detection element and a discharging control output;
means for providing electric power;
means for receiving a first signal to change a voltage level at an input of the overdischarge detection element of the protection circuit;
means for detecting the change of the voltage level at the input of the overdischarge detection element, and
means for providing a second signal at the discharging control output to switch off the means for providing electric power.

DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

In the following, several embodiments of the invention will be described in the context of battery protection circuits and apparatuses using batteries. It is to be noted, however, that the invention is not limited to this particular arrangement. In fact, the different embodiments have applications widely in any environment where improvement of battery protection and battery lifetime may be beneficial. For example, the invention may be applicable to handheld computers, music players, personal digital assistances (PDAs), remote controllers, wireless surveillance systems, electric toothbrushes etc.

Figure 1A:
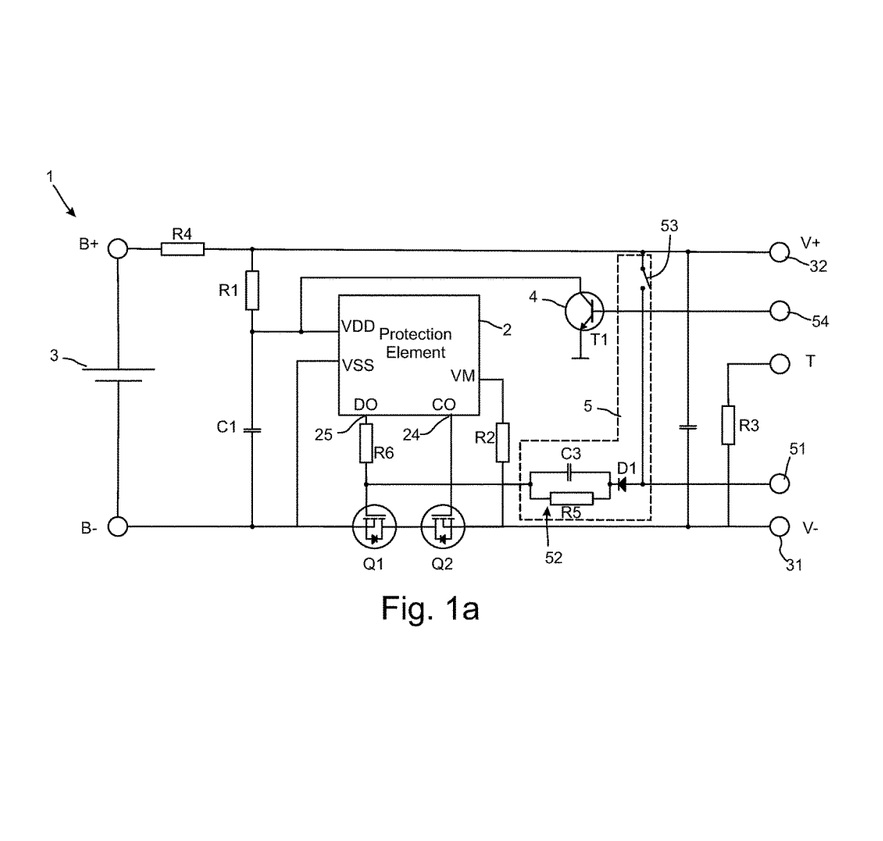
FIG. 1a shows a block diagram of an apparatus according to an example embodiment.

FIG. 1a shows a block diagram of an apparatus 1 according to an example embodiment. The apparatus 1 comprises a protection element 2 for monitoring different voltages and/or currents related to the apparatus and for performing or controlling operations to prevent different undesirable situations to occur. For example, the protection element 2 may be designed to detect overcharge of a battery 3, over discharge of the battery 3, and/or overload of the battery 3. A more detailed operation of the protection element will be described later in this application. The apparatus also comprises a first switching element 4 (T1) for setting the apparatus 1 in a shutdown state. There is also provided a wake-up circuitry 5 so that the apparatus 1 can be changed from the shutdown state to an operational state. In this example embodiment the wake-up circuitry 52 comprises a control input 51 for providing a control signal to the wake-up circuitry 5 when the apparatus 1 is to be woken up from the shutdown state. The control input 51 is connected to a forward biased diode D1 so that the control signal can be conducted to the pulse generation circuit 52. In this example embodiment the pulse generation circuit 52 comprises a resistor R5 and a capacitor C3 connected in parallel. The pulse generation circuit 52 is connected to a control input of a second switching element Q1. There is also another resistor R6 connected between the gate of the second switching element Q1 and a discharging control output 25 (DO) of the protection element 2. The apparatus 1 further comprises a third switching element Q2, which can be controlled by the charging control output 24 (CO). The charging control output 24 is connected e.g. to a control input of the third switching element Q2. The second switching element Q1 and third switching element Q2 are connected in series so that they can control the supply of power from the battery 3 to a device 7 to which the apparatus 2 may be connected, or from a charger to the battery 3 when the battery 3 is being charged.

There is also a negative voltage connection 31 and a positive voltage connection 32 in the apparatus which can be used to supply electric power from the apparatus 1 to the device 7 and to provide electric power to the battery 3 when charging the battery 3.

In this example embodiment the second switching element Q1 and third switching element Q2 are N-channel MOS FET transistors (metal oxide on silicon field effect transistors) but in some other embodiments other switching elements may also be used which can be controlled by the control input. The second switching element Q1 comprises a diode which is forward connected between a source and a drain of the second switching element Q1. Correspondingly, the third switching element Q2 comprises a diode which is forward connected between a source and a drain of the third switching element Q2. Hence, during charging a current can flow through the second switching element Q1 irrespective of the value of the control signal at the gate of the second switching element Q1 and the charging can be controlled by the second switching element Q1. During discharging a current can flow through the third switching element Q2 irrespective of the value of the control signal at the gate of the third switching element Q2 and the discharging can be controlled by the third switching element Q2.

In this example embodiment the series connection of the second switching element Q1 and third switching element Q2 is implemented in such a way that the drain of the second switching element Q1 is connected to the drain of the third switching element Q2. The source of the second switching element Q1 is connected to be in electrical connection with the negative contact of the battery 3 and a source of the third switching element Q2 is connected to the negative voltage connection 31 of the apparatus 1.

Figure 1B:
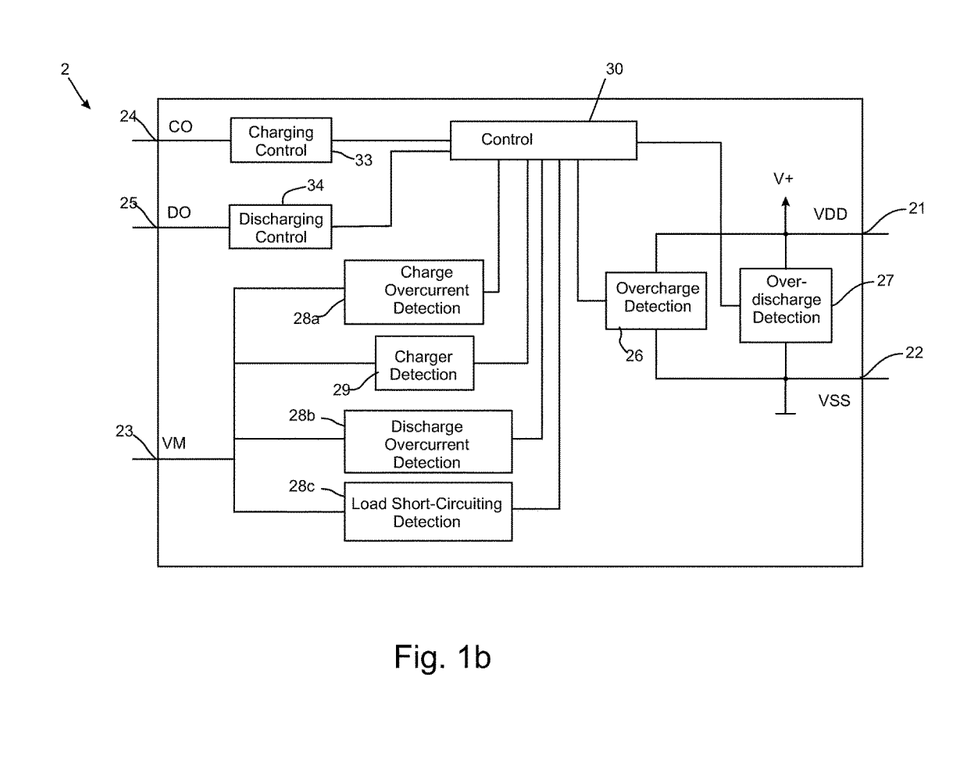
FIG. 1b shows a block diagram of a protection element of the apparatus according to an example embodiment.

FIG. 1b shows a block diagram of the protection element 2 according to an example embodiment. In this example embodiment the protection element 2 comprises a first input 21 for connecting a positive voltage connection 32 to the protection element and a second input 22 for connecting the negative voltage connection 31 to the protection element 2. The protection element 2 also comprises a sensing input 23 (VM), which is internally connected to a charge overcurrent detection circuit 28a, a discharge overcurrent detection circuit 28b, load short-circuiting detection circuit 28c for detecting possible overcurrent situations during charging and discharging and load short-circuiting situation. The protection element 2 may also comprise a charger detection circuit 29 for detecting when the apparatus 1 is connected to the charger 6. The protection element 2 further comprises a charging control output 24 (CO) for controlling charging of the battery 3 and the discharging control output 25 (DO) for controlling discharging of the battery 3. Overcharge can be detected by an overcharge detection circuit 26 which senses the voltage across the first input 21 and the second input 22 during charging the battery 3. Correspondingly, an overdischarge detection circuit 27 senses the voltage across the first input 21 and the second input 22 to detect a possible overdischarge situation during discharging the battery 3. The control circuit 30 of the protection element 2 may use information provided by the different detection circuits 26, 27, 28a, 28b, 28c, 29 of the protection element 2 to detect possible abnormal situations.

In some embodiments a signal at the charging control output 24 may be directly provided by the control circuit 30, whereas in some other embodiments the signal may be provided to a charging control element 33 which may then form the signal to the charging control output 24. Correspondingly, in some embodiments a signal at the discharging control output 25 may be directly provided by the control circuit 30, whereas in some other embodiments the signal may be provided to a discharging control element 34 which may then form the signal to the discharging control output 25.

The battery 3 may comprise one or more cells. For example, the battery may comprise two, three, four or more cells connected in serial. In some embodiments the battery 3 may comprise two or more cells connected in parallel. In some further embodiments the battery 3 may comprise two or more sets of serial connected cells and these sets may then be connected in parallel with each other. When the battery 3 comprises more than one cell, the apparatus 1 may comprise circuitry to charge each cell separately and/or monitor the charging situation of each cell to decrease the possibility that charging level in different cells varies more than is desired. For example, if a battery 3 is a lithium polymer battery comprising two cells connected in series, the voltage level measures between the positive and the negative contact of the battery may show normal values but the charging level in one of the cells may be significantly different from the charging level of the other cell of the battery. Therefore, some additional circuitry may be needed but still embodiments of the present invention can be described using only the circuitries presented in the appended figures.

In the following the operation of the apparatus 1 is described in more detail in different situations. When the apparatus 1 is connected to the battery 3 but is not connected to any electrical device for providing electricity for the device. The battery 3 supplies power from the positive contact of the battery 3 to the protection element 2 via the first temperature dependent resistor R4 which may be, for example, a resistor having a positive temperature coefficient. However, in some embodiments this first temperature dependent resistor R4 may not be needed. There is also another resistor R1 in series with the temperature dependent resistor R4 and connected to the first input 21 of the protection element 2. The negative contact of the battery 3 is connected to the second input 22 of the protection element 2. The sensing input 23, which is connected via the resistor R2 to the negative output V− of the apparatus 1, provides the voltage at the sensing input 23 to the charge overcurrent detection circuit 28a, to the discharge overcurrent detection circuit 28b, to the load short-circuiting detection circuit 28c, and to the charger detection circuit 29.

When the voltage of the battery 3 is within a first threshold TH1 and a second threshold TH2 indicating that the battery 3 is not overcharged or overdischarged, the overcharge detection circuit 26 nor the overdischarge detection circuit 27 do not provide an indication of an overcharge or overdischarge situation.

Figure 2:
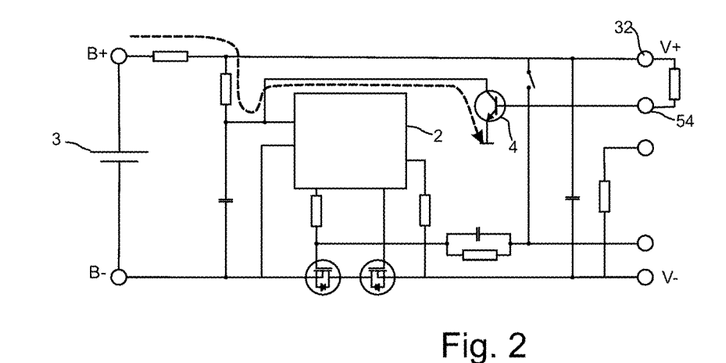
FIG. 2 illustrates the operation of the protection circuitry of FIG. 1 when switching the protection circuitry to an off state.

It may be possible to decrease the current consumption of the apparatus 1 by using the first switching element 4 e.g. as follows. The first switching element 4 may be switched on i.e. closed for a while which means that the current flowing through the first temperature dependent resistor R4 and the resistor R1 increases. This causes that the voltage at the positive voltage connection VDD decreases below the first threshold TH1. The overdischarge detection circuit 27 recognizes this and provides an indication of an overdischarge state to the control circuit 30. Hence, the control circuit 30 generates a signal to the discharging control output 25, either directly or by using the discharging control element 34. This signal will switch the third switching element Q2 off. As a consequence the current consumption of the protection element 2 will decrease and will slow down the discharging of the battery 3. This state will also be called as a low-power mode in this application. Decreased current consumption means that charge in the battery 3 remains longer and it may be possible to increase e.g. storage time of the apparatus 1.

The first switching element 4 may be electrically controllable e.g. by software or it may also be possible to manually control the first switching element 4. In some embodiments the first switching element 4 may comprise both electrically and manually controllable switches so that the apparatus 1 can be switched to the low-power mode.

The electrical control of the first switching element 4 may be implemented e.g. in such a way that the first switching element 4 comprises a transistor and the control input 54 (e.g. a base or a gate of the transistor) is provided a signal from the device 7 the apparatus 1 may have been attached with. The user of the device 7 may use the user interface of the device 7 to switch the apparatus 1 to the low-power mode or the software of the device may perform this automatically e.g. when one or more conditions are fulfilled. There may be an appropriate software in the device 7 which may cause the device 7 to generate a signal to the control input of the first switching element 4 so that the first switching element 4 is switched on for a while and the protection element 2 reacts to this situation and switches the apparatus 1 to the low-power mode as indicated above.

When the protection element 2 has been set to the low-power mode only a part of the protection element 2 is powered by the battery 3 and thus power consumption can be reduced. In this example embodiment only the first input 21 and the second input 22 are powered by the battery 3. This may also cut out the rest of the system power at the same time and ensure best possible off-time power saving. On some devices the system power may not need very low power state at all, enabling simpler and cheaper or more robust circuit solutions.

Figure 3:
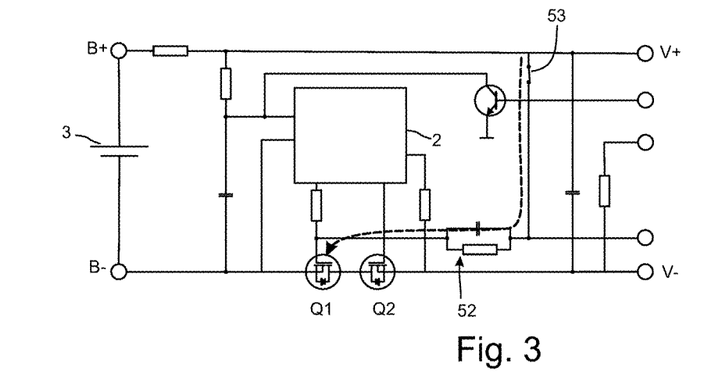
FIG. 3 illustrates the operation of the protection circuitry of FIG. 1 when switching the protection circuitry from the off state to an on state.

In some example embodiments switching the apparatus 1 from the low-power mode to a normal operation mode may be implemented as follows. For example, the user of the device 7 presses a fourth switching element 53 so that the fourth switching element 53 is switched on. The fourth switching element 53 is in electrical connection between the positive voltage connection 32 and the control input 51 of the wake-up circuitry 5. Hence, a positive voltage pulse is generated by the pulse generation circuit 52 causing that the voltage level at the gate of the second switching element Q1 momentarily increases. Therefore, the second switching element Q1 is switched on so that electric power can be supplied from the battery 3 to the device 7 which can then be switched on. The control input 51 of the wake-up circuitry 5 can also be used as a wake-up detection connection for the device 7. The device 7, when powered-up, can monitor the status of the wake-up detection connection and when the device 7 detects that the voltage level of the wake-up detection connection is indicative of activation of the wake-up circuitry, the device 7 may perform some tasks relating to the wake-up situation as will be described later in this application. In this embodiment the voltage level of the wake-up detection connection is indicative of activation of the wake-up circuitry when the voltage level is above a third threshold TH3 but in some other embodiments the voltage level may be different from that, e.g. lower than a predetermined level.

The above disclosure described the operation of the apparatus 1 when switching the apparatus 1 to the low-power mode and when switching the apparatus 2 from the low-power mode to the normal operation mode. In the following some example embodiments will be provided on how the low-power mode could be initiated and how to restore the normal operation mode.

Figure 4A:
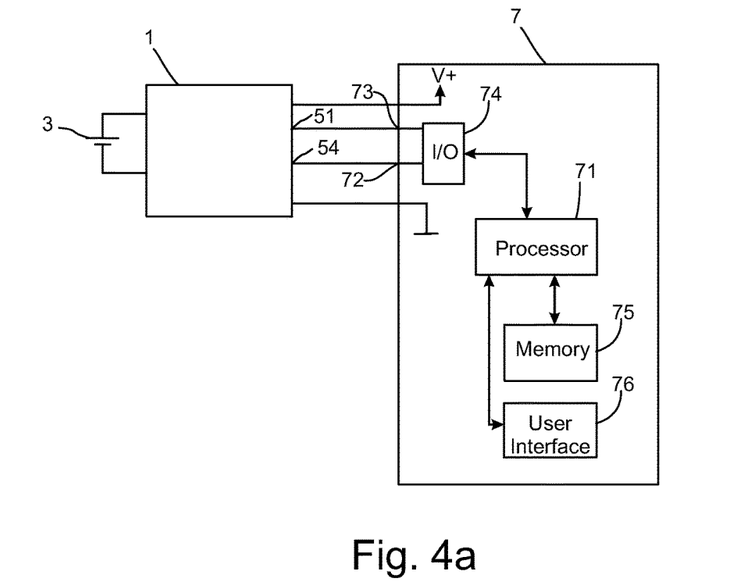
FIG. 4a shows a device attached with an apparatus according to an example embodiment.
Figure 4B:
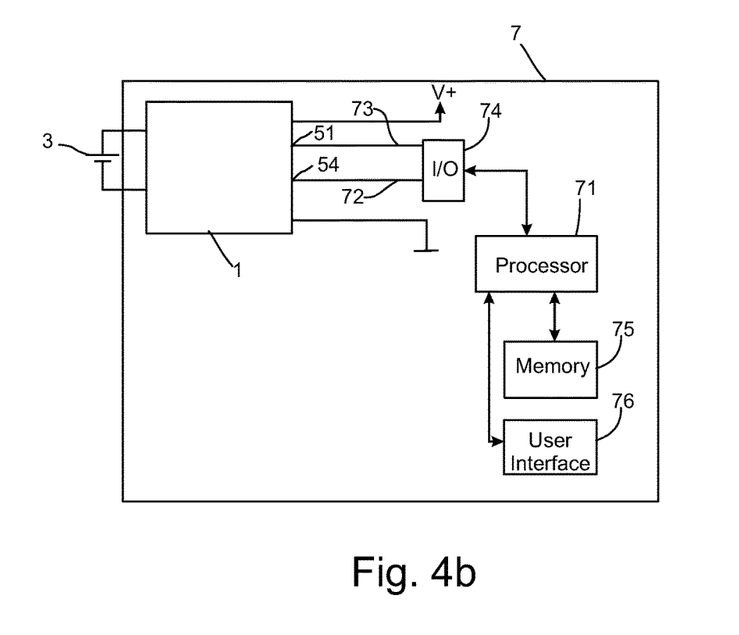
FIG. 4b shows another device embodied with an apparatus according to an example embodiment.
Figure 4C:
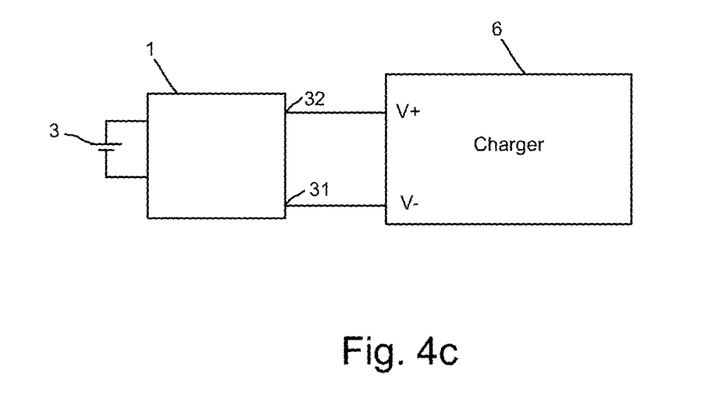
FIG. 4c shows an apparatus according to an example embodiment connected to a charger.

The apparatus 1 may be connected to the device 7 so that the apparatus 1 can be used as a power source for the device 7. In some other embodiments the apparatus 1 may be part of the device 7 wherein the battery 3 may be attached to the device 7 and detached from the device 7, for example to replace a used battery 3 with a new one. In some further embodiments the battery 3 may also be part of the device and may or may not be detachable by the user of the device 7.

The device 7 can be any electrical device which can be operated by electric power from the battery 3. In some example embodiments the device 7 is a portable device such as a mobile terminal, a headset (e.g. a hands-free device) for the mobile terminal or another wireless audio device. The device 7 may also be a remote controller or other portable controlling apparatus.

FIG. 4a illustrates an example in which the apparatus 1 and the device 7 are separate entities attachable with each other, whereas FIG. 4b illustrates an example in which the apparatus 1 and the device 7 are implemented as a single entity. It should be noted, however, that these examples are only shown to illustrate some embodiments of the present invention but also other embodiments may also apply when implementing the present invention.

The internal structure of the apparatus 1 may correspond with the example block diagrams of FIGS. 1a and 1b, for example. Therefore, it is not necessary to show the detailed structure of the apparatus 1 in FIGS. 4a and 4b.

First, it is assumed that the apparatus 1 and the device 7 are in normal operation state. Then, the user of the device 7 intends to switch off the device 7, for example by using the user interface 76 of the device 7. This is illustrated with the block 502 in the flow diagram of FIG. 5a. The computer program instructions of the software of the device 7 may then recognize that before switching the device 7 off the apparatus 1 could be switched to the low-power mode to further reduce energy consumption of the apparatus 1 when the device 7 is switched off. Therefore, the device 7 may comprise computer program instructions which when executed by the processor 71 of the device 7 causes a generation 508 of a signal e.g. by the input/output block 74 to the first switching element 4 to switch the first switching element 4 on and, hence, to put the apparatus to the low-power mode as illustrated above in the application. Before the signal is generated the computer program may cause the processor 71 to execute instructions to store 506 some status data of the device 7 e.g. to the memory 75 so that the status of the device 7 may be restored after switching the device 7 on at a later state.

Figure 5A:
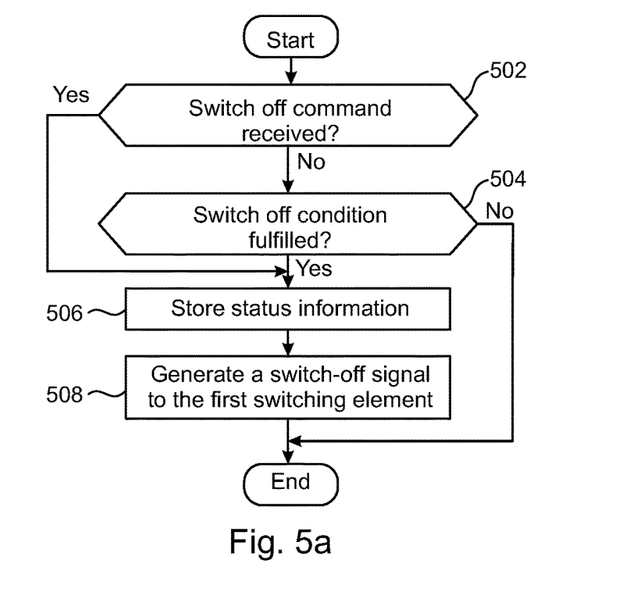
FIG. 5a shows a flow diagram of a method according to an example embodiment when switching the protection circuitry to an off state.

The signal to switch the apparatus 1 to the low-power mode may also be generated by the computer program instructions at some other situations. For example, after manufacturing the apparatus 1 the apparatus 1 may be tested and when the tests have been performed the testing personnel may initiate the generation of the signal to switch the apparatus 1 to the low-power mode. The apparatus 1 may also comprise a testing software which may automatically initiate the switch to the low-power mode after successful testing procedure has been conducted with the apparatus 1.

In some embodiments the device 7 or even another device may generate the signal to switch the apparatus 1 to the low-power mode after some operation has been performed or ended. For example, if the apparatus 1 is a part of a handset, the handset or a mobile terminal may initiate the switching to the low-power mode e.g. when a call has been terminated or when another switch off condition is fulfilled (block 504 in FIG. 5a). The handset may then remain in the low-power mode until the user presses the fourth switching element 53 e.g. when the user detects that there is an incoming call or when the user wishes to make a call.

Figure 5B:
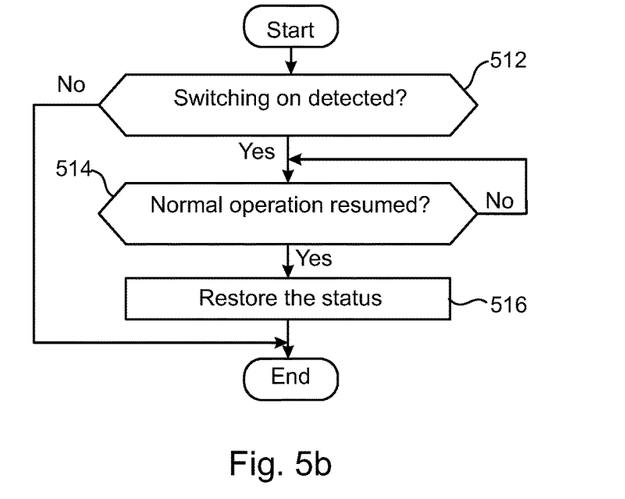
FIG. 5b shows a flow diagram of a method according to an example embodiment when switching the protection circuitry to an on state.

When the apparatus 1 is in the low-power mode and e.g. the user of the device wishes to switch the apparatus 1 and the device 7 on, the user may press the fourth switching element 53 so that the fourth switching element 53 is switched on. This causes the generation of the pulse at the control input of a second switching element Q1 and the second switching element Q1 is switched on so that electric power can be supplied from the battery 3 to the device 7 as described above. This is illustrated with the block 512 in the flow diagram of FIG. 5b. The computer program instructions of the device 7 may comprise instructions to detect the status of the wake-up detection connection and when the device 7 has detected that the normal operation mode of the apparatus 1 has been resumed 514, the device 7 may perform some tasks relating to this situation such as restore 516 the status of the device 7 to correspond with the status of the device before switching off the device 7.

In the embodiment of FIG. 4a the device 7 has a low-power signal output 72 which can be connected with the control input of the first switching element 4. The device 7 also has a wake-up signal input 73 which can be connected with the control input 51 of the wake-up circuitry 5 of the apparatus 1.

In the embodiment of FIG. 4b the control input of the first switching element 4 can be internally connected with the low-power signal output 72. Respectively, the wake-up signal input 73 can be internally connected with the control input 51 of the wake-up circuitry 5.

In the embodiment of FIG. 4b, the wake-up signal input 73 may be controlled by software. For example, software may be used provide a wake-up signal from input 73 to control input 51 of the wake-up circuitry 5 in various situations. In an embodiment, a wake-up signal may be provided to the control input 51 in accordance with detecting a near-field communication (NFC) connection to another device. However, the generation of the wake-up signal may need external energy since the system power from the battery 3 has been switched off. This power can be taken from a coil which may be a part of the near-field communication circuitry (NFC coil) or by some other means like inductive coupling.

Some embodiments of the present invention may improve the life time of batteries 3, increase the storage time of the batteries 3 without a need to charge the batteries 3 so often. In some embodiments the controlled switching to the low-power mode before the charging level drops too low may also prevent harmful gas generation inside the batteries 3.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatuses, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys Inc., of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In the following some examples will be provided.

In some embodiments there is provided a method comprising:
providing a first signal to an apparatus comprising a protection circuit and an output for providing electric power; the protection circuit comprising at least an overdischarge detection element and a discharging control output;

using the first signal to change a voltage level at an input of the overdischarge detection element of the protection circuit;

detecting the change of the voltage level at the input of overdischarge detection element, and providing a second signal at the discharging control output to switch off the output of the apparatus.

In some embodiments the method comprises using the first signal to decrease the voltage level below a first threshold.

In some embodiments the method further comprises receiving the first signal from a device attached with the apparatus.

In some embodiments the method comprises supplying electric power from the apparatus to the device via a second switching element.

In some embodiments the method comprises using the second signal to switch off the second switching element.

In some embodiments the method further comprises providing a third signal to switch on the apparatus.

In some embodiments the method comprises using the third signal to switch on the second switching element.

In some embodiments there is provided an apparatus comprising:
a protection circuit comprising at least an overdischarge detection element and a discharging control output;

an output for providing electric power; the protection circuit;

a first signal input adapted to receive a first signal to change a voltage level at an input of the overdischarge detection element of the protection circuit;

wherein the overdischarge detection element is configured for:

detecting the change of the voltage level at the input of the overdischarge detection element, and providing a second signal at the discharging control output to switch off the output of the apparatus.

In some embodiments the apparatus comprises a first switching element to decrease the voltage level below a first threshold.

In some embodiments the apparatus further comprises an input to receive the first signal from a device attached with the apparatus.

In some embodiments the apparatus comprises a second switching element to supply electric power from the apparatus to the device.

In some embodiments the apparatus is configured for using the second signal to switch off the second switching element.

In some embodiments the apparatus further comprises an input to receive a third signal to switch on the apparatus.

In some embodiments the apparatus comprises a pulse circuit configured to generate a pulse on the basis of the third signal to switch on the second switching element.

In some embodiments there is provided an apparatus comprising a processor and a memory including computer program code, the memory and the computer program code configured to, with the processor, cause the apparatus to:
receive a signal to switch-off a protection circuit; and
generate a switch-off signal to the protection circuit.

In some embodiments the apparatus comprises computer program code configured to, with the processor, cause the apparatus to store a status of the apparatus.

In some embodiments the apparatus comprises computer program code configured to, with the processor, cause the apparatus to detect that the apparatus has been switched on; and to restore the status of the apparatus.

In some embodiments the apparatus comprises computer program code configured to, with the processor, cause the apparatus to determine whether one or more conditions to switch-off the protection circuit has been fulfilled; and if so, to generate the switch-off signal.

In some embodiments the apparatus comprises computer program code configured to, with the processor, cause the apparatus to determine whether one or more conditions to switch-on the protection circuit has been fulfilled; and if so, to generate a switch-on signal to switch the protection circuit to a normal state.

In some embodiments there is provided an apparatus comprising:
- a protection circuit comprising at least an overdischarge detection element and a discharging control output;
- means for providing electric power;
- means for receiving a first signal to change a voltage level at an input of the overdischarge detection element of the protection circuit;
- means for detecting the change of the voltage level at the input of the overdischarge detection element, and
- means for providing a second signal at the discharging control output to switch off the means for providing electric power.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
    receiving a control signal at a control signal input of an apparatus comprising a protection circuit, and an output for providing electric power, wherein the protection circuit comprises at least an overdischarge detection element and a discharging control output, an input of the overdischarge detection element is coupled to a battery contact and the control signal input, and the control signal input of the apparatus is connected to the input of the overdischarge detection element via a first switching element;
    using the control signal to change a voltage level at the input of the overdischarge detection element of the protection circuit;
    detecting the change of the voltage level at the input of the overdischarge detection element; and
    providing a second signal at the discharging control output to switch off the output of the apparatus.

2. The method according to claim 1, wherein the using the control signal to change the voltage level comprises using the control signal to decrease the voltage level below a first threshold.

3. The method according to claim 1 further comprising receiving the control signal from a device attached with the apparatus.

4. The method according to claim 3 comprising supplying electric power from the apparatus to the device via a second switching element.

5. The method according to claim 4 comprising using the second signal to switch off the second switching element.

6. The method according to claim 4 further comprising providing a third signal to switch on the apparatus.

7. The method according to claim 6 comprising using the third signal to switch on the second switching element.

8. An apparatus comprising:
    a protection circuit comprising at least an overdischarge detection element and a discharging control output;
    an output for providing electric power;
    a battery contact coupled to an input of the overdischarge detection element of the protection circuit; and
    a control signal input connected to the input of the overdischarge detection element via a first switching element, the control signal input adapted to receive a control signal to change a voltage level at the input of the overdischarge detection element of the protection circuit,
    wherein the overdischarge detection element is configured to:
        detect the change of the voltage level at the input of the overdischarge detection element, and
        provide a second signal at the discharging control output to switch off the output of the apparatus.

9. The apparatus according to claim 8, wherein the control signal input is adapted to receive the control signal to decrease the voltage level below a first threshold.

10. The apparatus according to claim 8, wherein the control signal input receives the control signal from a device attached with the apparatus.

11. The apparatus according to claim 10 comprising a second switching element to supply the electric power from the apparatus to the device.

12. The apparatus according to claim 11 configured to use the second signal to switch off the second switching element.

13. The apparatus according to claim 11 further comprising an input to receive a third signal to switch on the apparatus.

14. The apparatus according to claim 13 comprising a pulse circuit configured to generate a pulse on the basis of the third signal to switch on the second switching element.

15. An apparatus comprising:
    a protection circuit comprising at least an overdischarge detection element and a discharging control output;
    an output for providing electric power;
    a battery contact coupled to an input of the overdischarge detection element of the protection circuit;
    a control signal input connected to the input of the overdischarge detection element via a switching element; and
    a processor and a memory including computer program code, the memory and the computer program code configured to, with the processor, cause the apparatus to:
        receive a control signal at the control signal input; and
        in response to the reception of the control signal, generate a switch-off signal to the protection circuit to switch off the protection circuit.

16. The apparatus according to claim 15 comprising computer program code configured to, with the processor, cause the apparatus to store a status of the apparatus.

17. The apparatus according to claim 16 comprising computer program code configured to, with the processor, cause the apparatus to detect that the apparatus has been switched on; and to restore the status of the apparatus.

18. The apparatus according to claim 15 comprising computer program code configured to, with the processor, cause the apparatus to determine whether one or more conditions to switch-off the protection circuit has been fulfilled; and if so, to generate the switch-off signal.

19. The apparatus according to claim 15 comprising computer program code configured to, with the processor, cause the apparatus to determine whether one or more conditions to switch-on the protection circuit has been fulfilled; and if so, to generate a switch-on signal to switch the protection circuit to a normal state.

\* \* \* \* \*